(12) United States Patent
Inomata

(10) Patent No.: US 8,178,844 B2
(45) Date of Patent: May 15, 2012

(54) INFRARED DETECTING DEVICE AND MANUFACTURING METHOD THEREOF

(75) Inventor: Daisuke Inomata, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 548 days.

(21) Appl. No.: 12/382,306

(22) Filed: Mar. 12, 2009

(65) Prior Publication Data

US 2009/0314941 A1 Dec. 24, 2009

(30) Foreign Application Priority Data

Mar. 14, 2008 (JP) ................................. 2008-065703

(51) Int. Cl.
*G01J 5/00* (2006.01)
(52) U.S. Cl. .................................................. 250/338.4
(58) Field of Classification Search ............... 250/338.1, 250/338.4, 332
See application file for complete search history.

(56) References Cited

U.S. PATENT DOCUMENTS

| 6,201,243 B1 * | 3/2001 | Jerominek | 250/338.1 |
| 6,465,784 B1 | 10/2002 | Kimata | |
| 6,777,682 B2 * | 8/2004 | Ishikawa et al. | 250/338.4 |
| 7,417,229 B2 * | 8/2008 | Sasaki et al. | 250/338.1 |
| 2005/0072924 A1 * | 4/2005 | Wood et al. | 250/338.1 |
| 2008/0067389 A1 * | 3/2008 | Vilain | 250/338.1 |

FOREIGN PATENT DOCUMENTS

| JP | 2001-267542 | 9/2001 |
| WO | WO-99/31471 | 6/1999 |

OTHER PUBLICATIONS

T. Ishikawa et al., "Low-cost 320 × 240 uncooled IRFPA using conventional silicon IC process", SPIE Conference on Infrared Technology and Applications XXV, vol. 3698, pp. 556-564, 1999, refers to in p. 4 of specification.

* cited by examiner

*Primary Examiner* — Constantine Hannaher
(74) *Attorney, Agent, or Firm* — Rabin & Berdo, PC

(57) ABSTRACT

An infrared detecting device is provided that is capable of improving device characteristics thereof by narrowing the width of each beam portion. The infrared detecting device has an infrared detection portion having a thermoelectric transducing part formed over a semiconductor substrate via an air gap interposed therebetween, and the beam portions which are formed over the semiconductor substrate via the air gap interposed therebetween, support the infrared detection portion and electrically connect between the infrared detection portion and the semiconductor substrate, wherein each of the beam portions has an insulating material film and a conductive material layer exposed from the insulating material film to a side surface of each beam portion.

20 Claims, 4 Drawing Sheets

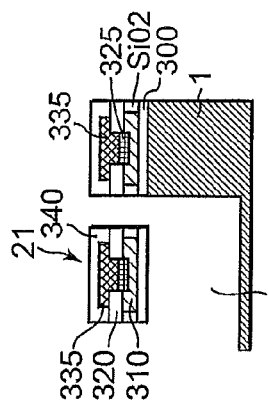
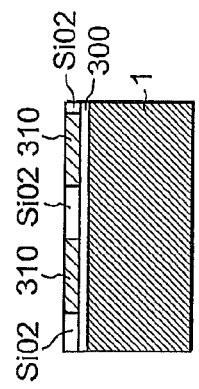
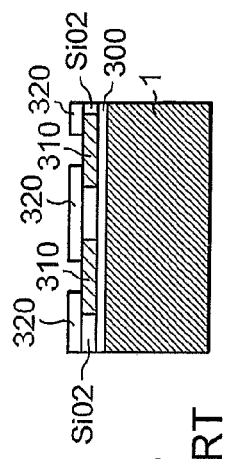
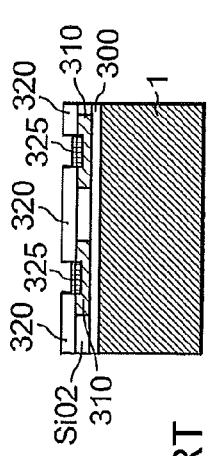
FIG. 3 PRIOR ART
FIG. 4 PRIOR ART
FIG. 5 PRIOR ART
FIG. 6 PRIOR ART
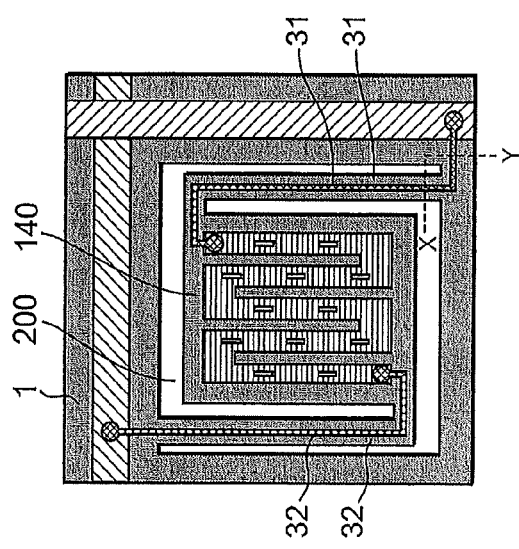
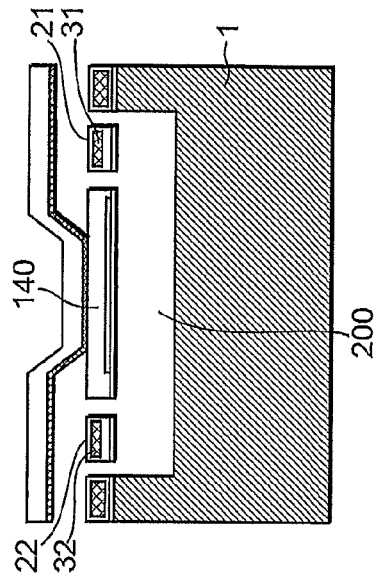
FIG. 1 PRIOR ART
FIG. 2 PRIOR ART

INFRARED DETECTING DEVICE AND MANUFACTURING METHOD THEREOF

BACKGROUND OF THE INVENTION

The present invention relates to an infrared detecting device and a manufacturing method thereof, and particularly to wiring structures of beam portions in a thermal-type infrared detecting device structure.

A conventional infrared detecting element or device has made use of band-to-band transition of electrons with infrared absorption and has been called "quantum type". In order to improve its detection sensitivity, there was a need to cool it to liquid nitrogen temperature or less and operate it in a state in which thermal noise has been eliminated. Therefore, the quantum type infrared detecting device essentially needs to have a chiller such as a stirling cooler. This is large in size and very expensive. Since its maintenance is also cumbersome in addition to the above, the infrared detecting device has been centered on applications to the field of military technology except for research work.

Since the market publication of an entirely new type infrared detecting device called "non-cooled type (thermal-type)" in the form of its opening to the general public of the military technology, the thermal-type infrared detecting device that makes it unnecessary the chiller has been studied and developed actively. The principle of operation of the thermal-type infrared detecting device is to cause an infrared detection portion thereof to absorb infrared radiation and transform it to heat and allow a thermoelectric transducing portion to detect a change in its temperature.

Several types have been reported as a system for converting the change in temperature to an electric signal. There have been well known a resistor bolometer system for detecting a change in the temperature of a detection portion as a change in electric resistance, a pyroelectric system for detecting a change in spontaneous polarization generated by distortion of a crystal lattice with a change in temperature, a diode system for detecting the dependence of current/voltage characteristics of a silicon pn diode on the temperature, a thermopile system for detecting an electromotive force generated according to the difference in temperature between contacts at two spots, etc.

Since the change in the temperature of the infrared detection portion of the infrared detecting device is converted into the electric signal as the characteristics common to all thermal-type infrared detecting devices, some contrivance to prevent heat or thermal energy based on absorbed infrared rays from escaping to a substrate located around the infrared detection portion is essential for keeping of sensitivity and its improvement.

Assuming now that infrared power incident on the infrared detection portion is Pin, radiation power emitted from the infrared detection portion is Pout, the temperature of the infrared detection portion is Td, the temperature of the substrate is Tsub, and thermal conductance between the infrared detection portion and the substrate is G, the outflow of the incident power from the infrared detection portion to the substrate is proportional to the difference in temperature therebetween and given as G(Td−Tsub) . . . (coefficient/equation 1). Thus, Pin=Pout+G(Td−Tsub) . . . (equation 2) is established from the relation of the conservation law. The flow of heat flux occurs until the temperature of the infrared detection portion and the substrate temperature become equal (Td=Tsub). Assuming now that when the incident power is changed by ΔPin, the temperature of the infrared detection portion is changed by ΔTd, Pin+ΔPin=Pout+ΔPout+G(Td+ΔTd−Tsub) . . . (equation 3) is established. Assuming that ΔPout<<GΔTd, the relationship of ΔTd=ΔPin/G . . . (equation 4) is obtained from the equations (2) and (3). Namely, the amount of change in the temperature of the infrared detection portion is inversely proportional to the thermal conductance G between the infrared detection portion and the substrate.

Namely, the thermal separation between the infrared detection portion and the substrate is essentially required to improve the sensitivity of the thermal-type infrared detecting device. It is very important to reduce the thermal conductance between the two.

In order to realize the thermal separation, there is provided, as a thermal-type common basic structure, a diaphragm structure wherein as shown in FIGS. 1 and 2, an air gap 200 is provided at an interface between an infrared detection portion 140 and a substrate 1, and support legs (called also "beam portions") 21 and 22 including metal wirings 31 and 32 which support the infrared detection portion from the substrate over the air gap 200 and at the same time take out electric signals of the infrared detection portion to the substrate side are provided (refer to patent documents 1 (Republished Patent Publication No. WO99/31471 (Japanese Patent Application No. 2000-539325)) and 2 (Japanese Patent Application Laid-Open No. 2001-267542), and a non-patent document 1 (SPIE Conference on Infrared Technology and Applications XXV. vol 3698, P556-564, 1999)).

Lengthening the beam portions and thinning same are considered as a choice of the beam-portion structure for reducing the thermal conductance as described above. When each of the beam portions is lengthened, such a structure that the beam portions 21 and 22 shown in FIG. 1 are folded back is taken and the area of the infrared detection portion 140 must be reduced. Therefore, the method of thinning the beam portions 21 and 22 is more effective to reduce the thermal conductance while the area of the infrared detection portion 140 is being maintained. According to the patent document 1 and the non-patent document 1, however, a technical problem arises in that the beam portions cannot be made so thin as will be described below.

FIG. 3 shows a sectional structure (developed section of a spot cut along line X-Y of FIG. 1) of a beam portion 21 analogized from the descriptions of the patent document 1 and the non-patent document 1. In the technology disclosed in the patent document 1, an SOI (Silicon On Insulator) semiconductor substrate 1 is used and a metal wiring 335 is formed over its corresponding silicon film 310 of a portion to be configured as a metal wiring patterned from the silicon film 310 located on an embedded silicon oxide film 300 embedded within the substrate 1, via a metal silicide 325 interposed therebetween. A wiring corresponding to a laminated body of the silicon film 310, the metal silicide 325 and the embedded silicon oxide film 300 is covered over its entirety by protective films of SiO$_2$ or the like such as an interlayer insulating film 340, a silicon oxide film 320 and the embedded silicon oxide film 300, so that the beam portion 21 is configured.

According to the manufacturing method of the patent document 1, the beam portion 21 is formed as described in FIGS. 4 through 9 to be shown below.

As shown in FIG. 4, a silicon monocrystal layer of a topmost surface of an SOI substrate 1 is oxidized such that a silicon film 310 remains corresponding to each desired metal wiring pattern, thereby to form a silicon oxide film SiO$_2$ as a separation film.

Next, a silicon oxide film 320 is formed on each of the silicon film 310 and the silicon oxide film SiO$_2$. Thereafter, each opening corresponding to the desired metal wiring pattern is defined in the silicon oxide film 320 by using a photolithography/etching technique as shown in FIG. 5 thereby to expose the surface of the silicon film 310 (pattern processing of each portion to form silicide.

Next, a metal film to be silicidized is formed on the surface of the exposed silicon film 310 and the silicon oxide film 320, followed by formation of a metal silicide by a quick heating method or the like. The unreacted metal film brought into no silicidization is removed with nitrohydrochloric acid, thereby forming a metal silicide 325 shown in FIG. 6 defined by each opening of the silicon oxide film 320.

Further, a predetermined wiring metal film is thereafter formed on each of the silicon oxide film 320 and the exposed metal silicide 325. Afterwards, the metal film is processed using the photolithography/etching technique, thereby forming a metal wiring 335 corresponding to each desired metal wiring pattern shown in FIG. 7.

Thereafter, as shown in FIG. 8, an interlayer insulating film 340 such as silicon oxide is formed on each of the silicon oxide film 320 and the metal wiring 335 as a protective layer.

Afterwards, as shown in FIG. 9, an etching window Wd for supplying an etchant upon execution of silicon etching is formed so as to extend through the interlayer insulating film 340, the silicon oxide film 320 and the embedded silicon oxide film 300. A gap between the infrared detection portion and the substrate is defined by the etching window Wd. A resist exposure process for forming the etching window Wd generally needs strict mask alignment accuracy.

Finally, a photolithography/etching process including silicon etching conducted via the etching window Wd is done to make the shapes of beam portions 21 and 22, whereby a structure for the infrared detection portion and the substrate both separated from each other by the air gap 200 shown in FIG. 3 is completed. The process steps taken up to here need the photolithography/etching process three times.

Assuming now that as shown in FIG. 10, the width of the beam portion 21 is L1, the width of the metal silicide 325 is L2 and the width (opening) of a forming region for causing a silicide reaction is L3, the relationship of L1>L2=L3 is established. That is, it is necessary to design the width L1 wider than the silicide region width L3 (=L2) so as to be twice (both sides) or more an alignment error in the photolitho process. This is because when the width of the beam portion is not greater than it, the end thereof is in danger of reaching the silicide region upon beam-portion shape etching, and when the silicide region is eliminated by etching, variations in wiring resistance occur, thereby significantly degrading the performance of the infrared detecting device. Further, since the metal wiring is formed on the metal silicide in the case of the patents for reference, the width of the beam portion must be twice or more as wide as an alignment error, for example in addition to the width of this metal wiring.

Assuming that in the case of design using a design rule of about 0.35 μm by way of example, a silicide width is 0.8 μm and a one-side alignment error is 0.3 μm, the metal wiring width and the beam portion width can be thinned only to 1.4 μm and 2.0 μm respectively. In other words, it is considered that when the beam portion width is fixed to a given value L, the silicide width must be set to L2×0.3 or less and hence the related art has required a reduction in resistance by addition of the metal wiring in terms of the electric resistance.

Thus, since the metal silicide is formed within each beam portion and the wiring layer is formed on the metal silicide, a beam-portion width margin for allowing for alignment displacement between those must be ensured, and the narrowing of the width of each beam portion was difficult. Since the wiring layer and the metal silicide are formed as for the wiring on each beam portion, the number of steps was increased in the related art.

SUMMARY OF THE INVENTION

Therefore, the present invention has been invented in view of the above-described conventional technical problems. It is an object of the present invention to provide an infrared detecting device which suppresses the number of steps and makes the width of a beam portion narrower thereby to enable an improvement in device characteristics, and a manufacturing method thereof.

According to one aspect of the present invention, for attaining the above object, there is provided an infrared detecting device comprising:

an infrared detection portion having a thermoelectric transducing part formed over a semiconductor substrate via an air gap interposed therebetween; and beam portions formed over the semiconductor substrate via the air gap interposed therebetween, the beam portions supporting the infrared detection portion and electrically connecting between the infrared detection portion and the semiconductor substrate, wherein each of the beam portions has an insulating material film and a conductive material layer exposed from the insulating material film to a side surface of the beam portion.

In the infrared detecting device according to the present invention, the conductive material layer can be comprised of a laminated structure of a silicon layer and a metal silicide layer.

In the infrared detecting device according to the present invention, the conductive material layer can be comprised of a single layer corresponding to a metal silicide layer.

In the infrared detecting device according to the present invention, the conductive material layer can be comprised of a metal layer.

In the infrared detecting device according to the present invention, the conductive material layer can be comprised of a signal layer corresponding to a metal layer.

In the infrared detecting device according to the present invention, the conductive material layer can be comprised of a laminated structure of a plurality of metal layers.

In the infrared detecting device according to the present invention, the metal layer is capable of being laminated over a metal silicide layer.

In the infrared detecting device according to the present invention, the metal layer is capable of being stacked over a metal silicide layer laminated in a silicon layer.

In the infrared detecting device according to the present invention, the silicon layer is capable of being formed as a monocrystal silicon film or a polysilicon film.

In the infrared detecting device according to the present invention, at least one of Pt, Ti, W, Co, Ni, Fe, Mo, Mn and Cr can be contained as a metal component for the metal silicide film.

In the infrared detecting device according to the present invention, an infrared absorption film can be bonded to the infrared detection portion.

According to another aspect of the present invention, for attaining the above object, there is provided a method for manufacturing an infrared detecting device including an infrared detection portion having a thermoelectric transducing part formed over a semiconductor substrate via an air gap interposed therebetween, and beam portions which are formed over the semiconductor substrate via the air gap interposed therebetween, support the infrared detection portion and electrically connect between the infrared detection portion and the semiconductor substrate, the method comprising the steps of:

forming the infrared detecting portion having the thermoelectric transducing part over the semiconductor substrate;

forming a conductive material layer that electrically connects between the infrared detection portion and the semiconductor substrate;

forming an insulating material film that covers the infrared detection portion and the conductive material layer;

collectively eliminating parts of the insulating material film and the conductive material layer thereby forming beam portions each having a side surface to which the conductive material layer is exposed;

forming a sacrifice layer that covers the conducive material layer exposed to the side surface of each of the beam portions;

eliminating part of the sacrifice layer thereby to expose the semiconductor substrate; and eliminating the semiconductor substrate by etching from an area in which the semiconductor substrate is exposed, thereby forming an air gap below the thermoelectric transducing part, the conductive material layer and the insulating material film located therearound.

In the method according to the present invention, parts of the insulating material film and the conductive material layer can be eliminated by etching in such a manner that the conductive material layer and each of the beam portions become identical in width, in the step for forming the beam portions.

In the method according to the present invention, the conductive material layer and the insulating material film can be formed by a thermal CVD method or a plasma CVD method.

The method according to the present invention can include a step for, in the step for forming the sacrifice layer, processing the sacrifice layer to expose the infrared detection portion, depositing an infrared absorption film over the surfaces of the infrared detection portion and the sacrifice layer and bonding the infrared absorption film onto the infrared detection portion.

According to the present invention, since a conductive material layer such as a metal silicide layer is also batch-processed upon beam-portion shape processing, an alignment error in a photolithography/etching process, which has presented a conventional problem, can be completely eliminated. It is therefore possible to bring the width of each beam portion to half or less of that employed in a conventional structure.

According to the present invention as well, since the conductive material layer such as the metal silicide layer can be expanded to the width of each beam portion, a reduction in resistance is enabled. The metal wiring layer that has been required in the related art becomes unnecessary, thus enabling process simplification and a reduction in cost. Incidentally, it is needless to say that the metal wiring layer may be laminated for the reduction in the resistance.

Further, according to the present invention, a failure in the agglomeration of a metal due to heat treatment is likely to occur with more thinning of the line width of the conductive material layer, particularly the metal silicide. Since, however, a silicide region can be formed broader than the width of the beam portion, the present invention brings about measures and effects even against a manufacturing failure in agglomeration.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a plan view showing pixels of a conventional infrared solid-state imaging device excluding an infrared absorbing section;

FIG. 2 is a sectional view illustrating an infrared detecting device structure of an SOI diode equipped with another conventional infrared absorption structure;

FIG. 3 is a partly sectional view of a spot cut along line X-Y of FIG. 1;

FIG. 4 is a partly sectional view of an SOI substrate in a manufacturing process of a conventional infrared solid-state imaging device;

FIG. 5 is a partly sectional view of the SOI substrate in the manufacturing process of the conventional infrared solid-state imaging device;

FIG. 6 is a partly sectional view of the SOI substrate in the manufacturing process of the conventional infrared solid-state imaging device;

DETAILED DESCRIPTION OF THE PREFERRED EMBODIMENTS

An infrared detecting device illustrative of a preferred embodiment according to the present invention will be described in detail with reference to the accompanying drawings.

Figure 10:
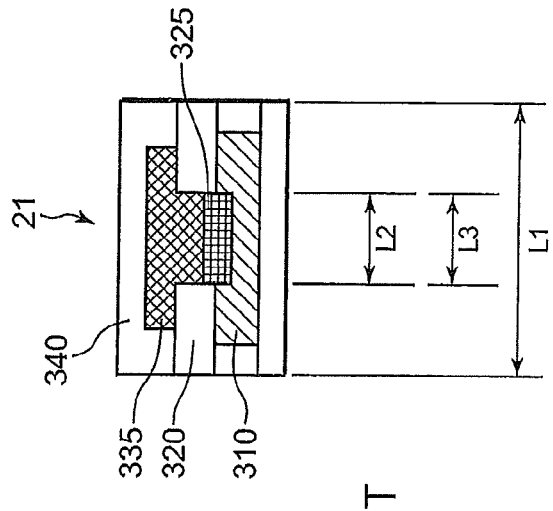
FIG. 10 is a partly sectional view of a beam portion employed in the conventional infrared solid-state imaging device.
Figure 11:
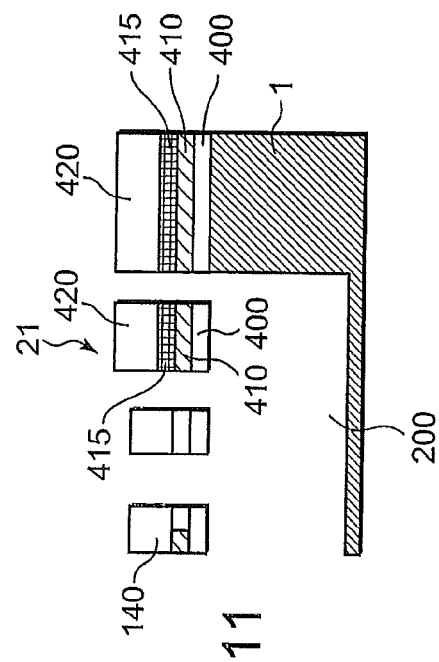
FIG. 11 is a partly sectional view of an infrared detecting device according to a preferred embodiment of the present invention.
Figure 7:
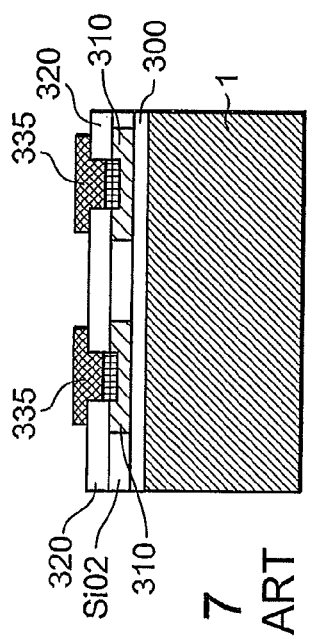
FIG. 7 is a partly sectional view of the SOI substrate in the manufacturing process of the conventional infrared solid-state imaging device.
Figure 8:
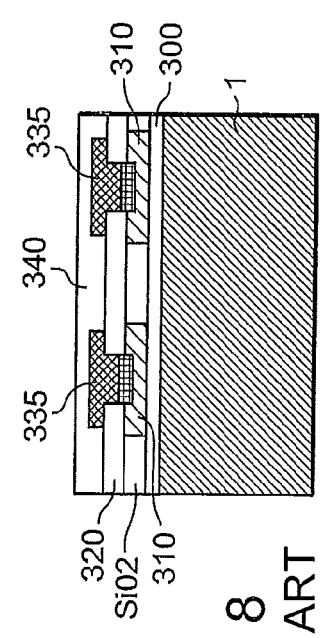
FIG. 8 is a partly sectional view of the SOI substrate in the manufacturing process of the conventional infrared solid-stat imaging device.
Figure 9:
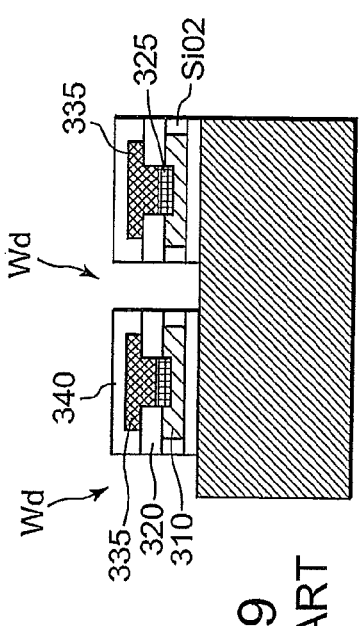
FIG. 9 is a partly sectional view of the SOI substrate in the manufacturing process of the conventional infrared solid-stage imaging device.

FIG. 11 is an enlarged partly sectional view of an infrared detecting device of the present embodiment and shows particularly a sectional structure (corresponding to a developed section of a spot cut along line X-Y of FIG. 1) of a beam portion 21. The beam portion 21 is provided, using an SOI substrate 1, over an embedded silicon oxide film 400 embedded therein and configured by a wiring corresponding to a laminated body of a silicon film 410 and a metal silicide 415 provided thereon, and a silicon nitride film 420 (protective film) provided thereon. The largest point of difference between the structure according to the present embodiment and the conventional structure in this case resides in that a silicide region exists inside the form of a beam portion to be described later in a conventional method whereas it extends to and is exposed to outer both sides thereof in the present invention.

The beam portion 21 is formed in accordance with a schematic order to be described in the following FIGS. 12 through 17. FIGS. 12 through 17 are respectively partly sectional views showing procedures of a process for manufacturing the infrared detecting device according to the present embodiment.

Figure 12:
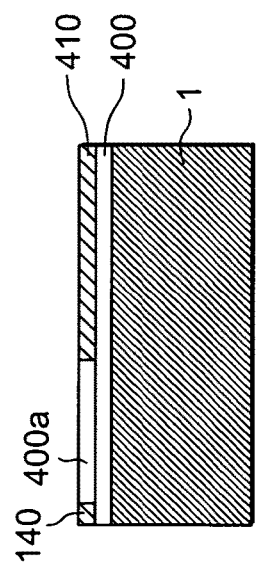
FIG. 12 is a partly sectional view of an SOI substrate in a manufacturing process of the infrared detecting device according to the preferred embodiment.

An SOI substrate 1 uniformly formed with a silicon film 410 over an embedded silicon oxide film 400 embedded therein is first prepared. As shown in FIG. 12, an infrared detection portion 140 is formed from the silicon film 410 and the embedded silicon oxide film of the SOI substrate is used as a protective insulating portion 400. Simultaneously with it, patterning is conducted in such a manner that the silicon film 410 remains corresponding to a desired metal wiring pattern. That is, a silicon monocrystal layer of the topmost surface of the SOI substrate 1 is oxidized in a pattern other than the infrared detection portion 140 and the metal wiring pattern so as to be formed as a protective insulating portion 400a. The infrared detection portion and the protective insulating portion 400 are formed adjacent to each other. The infrared detection portion 140 includes a thermoelectric transducing part and is formed as a pn diode row (not shown) with monocrystalline silicon as a material, for example. The protective insulating portion 400a formed adjacent to the infrared detection portion acts as an element or device separation region or area. An air-gap forming etching window to be described later is formed in an area for the protective insulating portion 400a formed of silicon oxide so as to be contained therein.

A metal silicide 415 is formed on its corresponding silicon film 410 that has been left for wiring thereby to form a support wiring portion. Here, a metal film for forming silicide is formed and thereafter the metal silicide 415 is formed by a quick heating method or the like.

Figure 13:
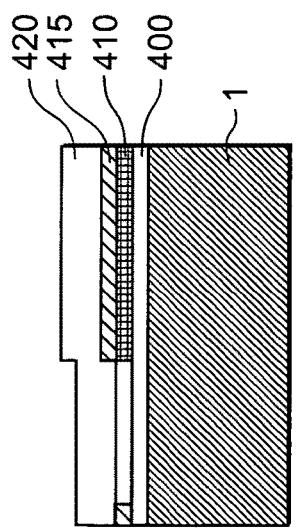
FIG. 13 is a partly sectional view of the SOI substrate in the manufacturing process of the infrared detecting device according to the preferred embodiment.

Afterwards, wet etching for eliminating an unreacted metal film is conducted and thereafter a silicon oxide film or a silicon nitride film 420 is formed as a protection layer as shown in FIG. 13. Although only the upper layer of the silicon film 410 has been partly silicidized in the present embodiment, the entire silicon film may be completely silicidized without leaving the silicon film. As a metal component for a metal silicide film, may be mentioned, at least one of Pt, Ti, W, Co, Ni, Fe, Mo, Mn and Cr.

Figure 14:
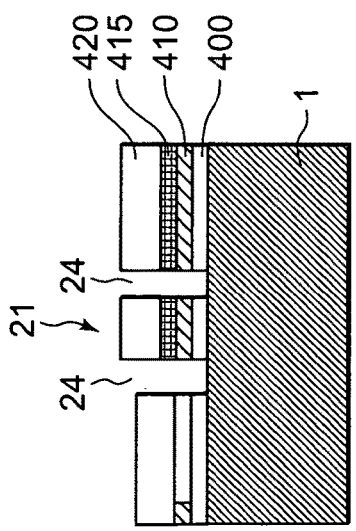
FIG. 14 is a partly sectional view of the SOI substrate in the manufacturing process of the infrared detecting device according to the preferred embodiment.

Next, as shown in FIG. 14, beam-portion forming through holes 24 that reach the substrate 1 are formed up to the silicon nitride film 420, the metal silicide 415, the silicon film 410 and the protective insulating portion 400 by anisotropic etching such as RIE in order to define a beam portion thereby exposing the surface of the semiconductor substrate 1. According to this process step, an area in which the infrared detection portion 140 is formed, and an area in which the beam portion 21 is formed are formed so as to be separated from each other.

Thus, such a beam portion structure as shown in FIG. 14 can be collectively formed by executing photolithography/etching for forming the beam-portion shape.

The greatest feature of the present embodiment resides in that the silicon nitride film 420, the metal silicide 415, the silicon film 410 and the embedded silicon oxide film 400 are batch-processed by using one photomask. Therefore, layout features are that the width of a silicide forming area is wider than a conventional one and the width of silicide coincides with the width of the beam portion after processing of the shape thereof.

Figure 15:
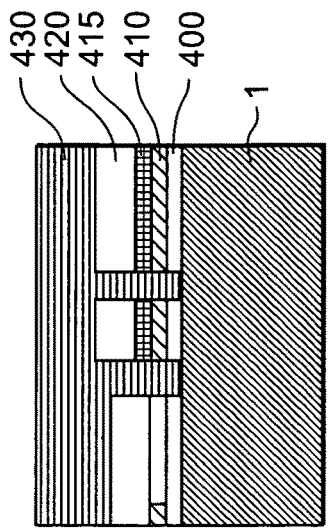
FIG. 15 is a partly sectional view of the SOI substrate in the manufacturing process of the infrared detecting device according to the preferred embodiment.

Next, as shown in FIG. 15, a sacrifice layer 430 formed of an insulating material is formed over the entire upper surface of the substrate inclusive of the inner sidewalls of the through holes 24. Incidentally, a reflection film and an infrared absorption film (not shown) bonded to the infrared detection portion to be described later can be formed in sequence by processing the upper surface of the sacrifice layer 430.

Figure 16:
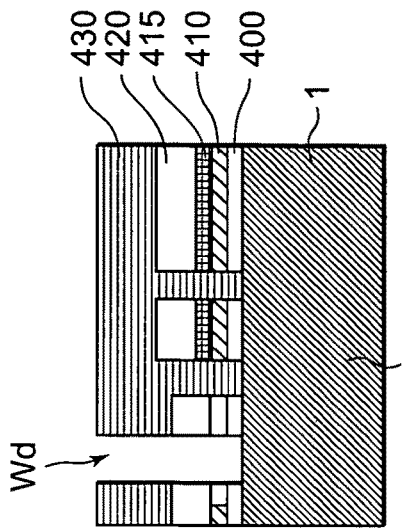
FIG. 16 is a partly sectional view of the SOI substrate in the manufacturing process of the infrared detecting device according to the preferred embodiment.

Next, as shown in FIG. 16, parts of the sacrifice layer 430 and the like (silicon nitride film 420, protective insulating portion 400a and embedded silicon oxide film 400) are removed by etching to form a trench that reaches the substrate 1, whereby an etching window Wd is formed.

Figure 17:
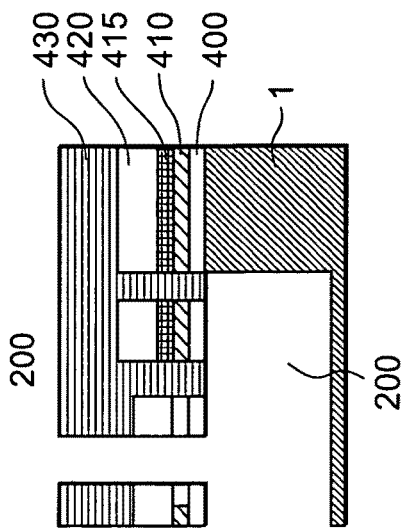
FIG. 17 is a partly sectional view of the SOI substrate in the manufacturing process of the infrared detecting device according to the preferred embodiment.

As shown in FIG. 17, the semiconductor substrate 1 that contacts the bottom face of the etching window is gradually etched to form an air gap 200. In the case of wet etching, a deep etching stopper (not shown) is embedded into the substrate 1 in advance so as to surround each beam portion area located around the infrared detection portion 140. In the case of gas etching, a shallow etching stopper (not shown) is formed since an etching shape becomes the deepest directly below a junction post adjacent to the etching window Wd and becomes shallow as it reaches its end. As illustrated in FIGS. 11 and 17, an insulation beam including the protective insulating portion 400a is disposed between the beam portion 21 and the infrared detection portion 140 in a direction parallel to a surface of the substrate 1 with an air gap being disposed along the direction between the insulation beam and the beam portion 21 and another air gap being disposed along the direction between the insulation beam and the infrared detection portion 140. As illustrated in FIG. 17, the insulation beam not include conductive material (e.g., silicon film 410 and a metal silicide 415) included in the beam portion 21. The insulation beam is also formed over the semiconductor substrate 1 via the air gap.

Next, the sacrifice layer 430 is eliminated by dry etching, for example, so that an infrared detecting device having such a structure as shown in FIG. 11 is obtained.

Figure 18:
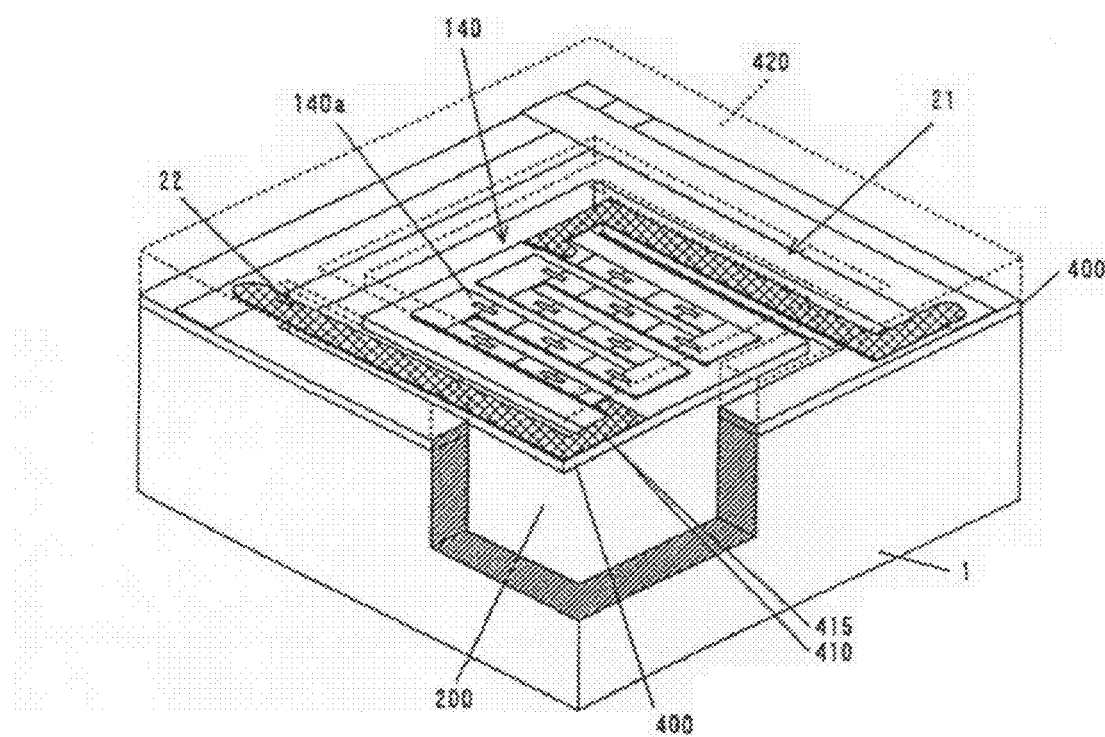
FIG. 18 is a schematic partly cut-off perspective view showing pixels of an infrared solid-state imaging device (except for an infrared absorption section) employed in the preferred embodiment.

A schematic partly cut-off perspective view showing pixels of an infrared solid-state imaging device (except for an infrared absorption section) employed in the preferred embodiment is shown in FIG. 18. The infrared detecting device includes an infrared detection portion 140 having a thermoelectric transducing part (for example, a pn diode row 140a located on an embedded silicon oxide film 400) formed on a semiconductor substrate 1 via an air gap 200, and beam portions 21 and 22 which are formed on the semiconductor substrate 1 via an air gap 200 interposed therebetween, support the infrared detection portion 140 and electrically connect between the infrared detection portion 140 and the semiconductor substrate 1. The beam portions 21 and 22 respectively have an insulating material film (silicon nitride film 420, for example) and have a conductive material layer (laminated structure of a silicon film 410 and a metal silicide 415 provided thereon, for example) exposed from the insulating material film to the side surfaces of the beam portions 21 and 22.

In the present embodiment, the accuracy is not so required as compared with mask alignment at beam formation even though the position of the air-gap forming etching window is slightly shifted, and simplification of a manufacturing process and an improvement in yield can be achieved.

Incidentally, although the pn diodes have been used in the thermoelectric transducing part as the infrared detecting method in the present invention, the present invention relates to structures of their beam portions and a manufacturing method thereof. A thermoelectric transducing system of its detection portion may be another resistor bolometer system or pyroelectric system or the like. The SOI substrate need not necessarily be used as the substrate either. Although the metal silicide layer has been formed on the silicon film provided on the embedded silicon oxide film in the present invention, similar effects can be obtained even in the case of, for example, a structure in which a metal silicide is formed on polysilicon provided on a silicon oxide film, and a manufacturing method thereof. That is, the present invention can be carried out even where the conventional metal wiring is formed as an alternative to the silicide formed in the beam portions. Although the conductive material formed in each beam portion has been configured by the metal silicide single layer in the present embodiment, metal films may be laminated on the metal silicide layer so as to be formed as a multilayer support wiring portion of plural layers.

While the preferred forms of the present invention have been described, it is to be understood that modifications will be apparent to those skilled in the art without departing from the spirit of the invention. The scope of the invention is to be determined solely by the following claims.

What is claimed is:

1. An infrared detecting device comprising:
   a semiconductor substrate;
   an infrared detection portion having a thermoelectric transducing part formed over the semiconductor substrate via an air gap interposed therebetween;
   beam portions formed over the semiconductor substrate via the air gap being interposed therebetween, said beam portions supporting the infrared detection portion and electrically connecting between the infrared detection portion and the semiconductor substrate,
   wherein each of the beam portions has an insulating material film and a conductive material layer exposed from the insulating material film at a side surface of the beam portion; and
   insulation beams disposed between the beam portions and the infrared detection portion.

2. The infrared detecting device according to claim 1, wherein the conductive material layer comprises a laminated structure of a silicon layer and a metal silicide layer.

3. The infrared detecting device according to claim 2, wherein the silicon layer is of a monocrystal silicon film or a polysilicon film.

4. The infrared detecting device according to claim 2, wherein at least one of Pt, Ti, W, Co, Ni, Fe, Mo, Mn and Cr is contained as a metal component for the metal silicide layer.

5. The infrared detecting device according to claim 1, wherein the conductive material layer comprises a single layer corresponding to a metal silicide layer.

6. The infrared detecting device according to claim 1, wherein the conductive material layer comprises a metal layer.

7. The infrared detecting device according to claim 6, wherein the conductive material layer comprises a signal layer corresponding to a metal layer.

8. The infrared detecting device according to claim 6, wherein the conductive material layer comprises a laminated structure of a plurality of metal layers.

9. The infrared detecting device according to claim 6, wherein the metal layer is laminated over a metal silicide layer.

10. The infrared detecting device according to claim 6, wherein the metal layer is laminated over a metal silicide layer laminated in a silicon layer.

11. The infrared detecting device according to claim 1, wherein an infrared absorption film is bonded to the infrared detection portion.

12. The infrared detecting device according to claim 1, wherein the insulation beams are disposed between the beam portions and the infrared detection portion in a direction parallel to a surface of the substrate with an air gap being disposed along the direction between the insulation beams and the beam portions and another air gap being disposed along the direction between the insulation beams and the infrared detection portion, the insulation beams not including conductive material and being formed over the semiconductor substrate via the air gap.

13. A method for manufacturing an infrared detecting device including an infrared detection portion having a thermoelectric transducing part formed over a semiconductor substrate via an air gap interposed therebetween, and beam portions which are formed over the semiconductor substrate via the air gap being interposed therebetween and that support the infrared detection portion and electrically connect between the infrared detection portion and the semiconductor substrate, said method comprising:
   forming the infrared detection portion having the thermoelectric transducing part over the semiconductor substrate;
   forming a conductive material layer that electrically connects between the infrared detection portion and the semiconductor substrate;
   forming an insulating material film that covers the infrared detection portion and the conductive material layer;
   collectively eliminating parts of the insulating material film and the conductive material layer thereby forming beam portions each having a side surface at which the conductive material layer is exposed;
   forming a sacrifice layer that covers the exposed conductive material layer;
   eliminating part of the sacrifice layer thereby to expose the semiconductor substrate; and
   eliminating a portion of the semiconductor substrate by etching from an area in which the semiconductor substrate is exposed from the sacrifice layer, thereby forming an air gap below the thermoelectric transducing part, the conductive material layer and the insulating material film located therearound.

14. The method according to claim 13, wherein in the step for forming the beam portions, parts of the insulating material film and the conductive material layer are eliminated by etching in such a manner that the conductive material layer and each of the beam portions become identical in width.

15. The method according to claim 13, wherein the conductive material layer and the insulating material film are formed by a thermal CVD method or a plasma CVD method.

16. The method according to claim 13, wherein in the step for forming the conductive material layer, the conductive material layer comprises a laminated structure of a silicon layer and a metal silicide layer.

17. The method according of claim 13, wherein in the step for forming the conductive material layer, the conductive material layer comprises a single layer corresponding to a metal silicide layer.

18. The method according to claim 13, wherein in the step for forming the conductive material layer, the conductive material layer comprises a metal layer.

19. The method according to claim 13, further including a step for, in the step for forming the sacrifice layer, processing the sacrifice layer to expose the infrared detection portion, depositing an infrared absorption film over the surfaces of the infrared detection portion and the sacrifice layer and bonding the infrared absorption film onto the infrared detection portion.

20. The method according to claim 13, further including a step of forming an insulation beams that do not include conductive material between the beam portions and the infrared detection portion during the step of eliminating the part of the sacrifice layer.

* * * * *